Nov. 17, 1931.  E. L. GALE  1,832,454
AUTOMATIC ELEVATOR CONTROL SYSTEM
Filed March 29, 1927  3 Sheets-Sheet 1

INVENTOR
Ernest L. Gale
BY
Marshall & Hawley
ATTORNEYS

Nov. 17, 1931.  E. L. GALE  1,832,454
AUTOMATIC ELEVATOR CONTROL SYSTEM
Filed March 29, 1927  3 Sheets-Sheet 2

INVENTOR
Ernest L. Gale
BY
Marshall & Hawley
ATTORNEYS

Nov. 17, 1931.  E. L. GALE  1,832,454
AUTOMATIC ELEVATOR CONTROL SYSTEM
Filed March 29, 1927  3 Sheets-Sheet 3

INVENTOR
Ernest L. Gale
BY
Marshall & Hawley
ATTORNEYS

Patented Nov. 17, 1931

1,832,454

UNITED STATES PATENT OFFICE

ERNEST L. GALE, OF YONKERS, NEW YORK, ASSIGNOR TO GURNEY ELEVATOR COMPANY, INC., OF NEW YORK, N. Y., A CORPORATION OF PENNSYLVANIA

AUTOMATIC ELEVATOR CONTROL SYSTEM

Application filed March 29, 1927. Serial No. 179,242.

My invention relates to elevators and more particularly to a push-button control system with circuits controlled by a movable or scale-beam platform.

In push-button control circuits for elevators, it is common practice to include a car gate switch in the operating circuit so that movement of the car cannot be effected by the hall or car buttons until the car gate and its switch are closed. But it frequently happens that the car gate is left open by the last passenger to leave the car thus causing delay and inconvenience due to the fact that the operating circuit is thereby broken at the car gate switch so that the car cannot be dispatched from the hall push-buttons.

One of the objects of this invention is to provide an arrangement for closing the car gate switch when the car is unoccupied and the car gate open, to render the system operable for dispatch of the car from the hall-buttons but yet requiring closure of the car gate before the car buttons are operative, as is usual.

Another object of the invention is to so construct and arrange the car gate switch as to have the mode of operation of a time controlled non-interference switch so that it is open-circuited to prevent interference subsequently to completing its function for hall-button operation and when the car reaches its destination the switch is closed again but this closing is delayed to introduce a time period to permit the hall passenger to open the hatchway door before the said gate switch closes again to restore or close the hall and car button feed circuit.

A further object of the invention is to provide an arrangement for opening the hall-button feed circuit the moment the car becomes occupied and which necessitates closure of the car gate before the car can be dispatched by the car buttons.

A still further object of the invention is to provide means controlled by the car platform to close a circuit for car lights when the platform is occupied, to open the circuit for the car lights when the car is unoccupied and not under dispatch and to close said light circuit by dispatch of the car by the hall-buttons so that the car will arrive lighted, to afford safety to the hall passenger in stepping onto the car platform. The light when controlled by hall-button dispatch, remains on for only a short period after car stop and is subsequently cut off if the hall passenger does not enter the car, but if one does occupy the car the light remains on. The light circuit is controlled in such delayed manner also when the last car passenger steps off the car platform so that the light in the car will be on for the hall passenger who may be waiting to use the car as the car passenger steps off, but in the absence of a hall passenger at this time, the light circuit will be opened automatically after the lapse of a short period of time.

Referring now to the accompanying drawings.

Figure 1:
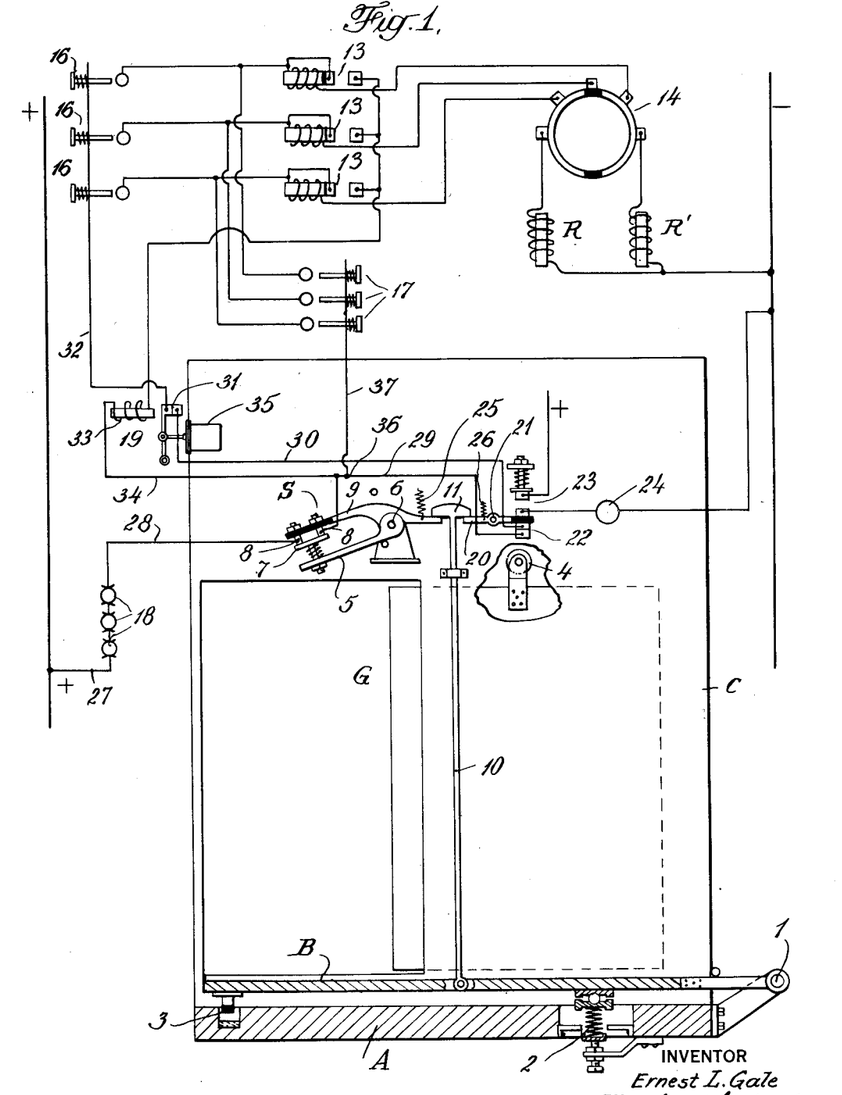
Fig. 1 illustrates in a more or less diagrammatic manner an elevator car having a relatively movable platform and a single automatic push-button system of control circuits embodying a car gate switch together with non-interference and car light switches as arranged in accordance with the present invention in one of its forms.

Referring now more particularly to Fig. 1, an elevator car C is illustrated in a more or less typical manner and consists of the framework A and a platform B movable with respect to the framework. This movement of the platform serves as a tell-tale as to whether it is occupied or not and in the present instance the platform is pivotally supported at 1 to have rocking movement against the action of an adjustable spring 2 when weight is imposed thereon. By adjustment of the spring 2 the platform may be made sensitive for movement, say for example by a minimum weight of 15 lbs. or so, which movement is limited by a rubber or leather shock absorber 3. It may be desirable with the use of a rocking platform of this type, in order to render its entire usable area sufficiently sensitive for actuation as intended, regardless of the position of the passenger thereon with respect to the pivot point, to locate the point of pivotal support some distance remote from the usable part of the platform and exterior of the car frame, as shown.

A car gate G may be of any well known type adapted to be actuated by a passenger, said gate having secured thereto a usual roller 4 to coact with a car gate switch S to open and close same. The car gate roller 4 closes said gate switch by engaging the switch arm 5 pivotally supported at 6, said arm carrying a spring pressed contact disk 7. By opening the car gate the arm 5 is thereby permitted to rock by gravity to open-circuit the car gate switch. The gate switch elements and their mode of operation by the car gate as thus far described are well known and in accordance with standard practice.

The gate switch contactors comprise the contact disk 7 to coact with contactors 8, 8 which are not as ordinarily used, in fixed positions, but are carried by a rocking arm 9 pivotally supported at 6, so that when the car gate is opened to permit the arm 5 to rock in a counter-clockwise direction to open-circuited position, the arm 9 by a follow-up movement will continue the engagement of its contacts 8, 8 with the disk 7 if the car platform is not occupied. In this manner the gate switch remains closed with the car gate open and permits dispatch of the car by the hall-buttons. But if the car platform is occupied, a rod 10, connected to the platform and having a laterally extended head 11, engages the arm 9 at the right of pivot 6 and maintains the contacts 8, 8 in raised position and by so preventing the follow-up movement of the arm 9 causes the switch S to open when the gate is open. It then becomes necessary to close car gate to close the car gate switch in order to dispatch the car by the car buttons.

An additional switch arm 20 pivoted at 21 and actuated by the movable car platform B through the intermediary of the rod 10 controls contactors 22 and 23. The contactors 22 function as an instantaneously operable non-interference switch and are normally closed with the car gate switch, in a circuit which feeds the hall-buttons. The contactors 23 control an independent circuit to provide a feed for a car light 24 which is normally open-circuited but is closed when the car platform is occupied.

The elements of the push-button control system are well known and have a well known mode of operation. They comprise floor relays 13, floor stop controlling mechanism 14, reversing switches R, R', hall-buttons 16, car buttons 17, hatchway door contacts 18, and an additional non-interference magnetic switch 19.

I will now describe the mode of operation of the car gate switch S and trace the circuit controlled thereby to permit dispatch of the car by a hall push-button with the car gate in open position, all the hatchway doors closed, and the car platform unoccupied.

As before stated, movement of the car gate to open position permits the switch arm 5 to rock in a counter-clockwise direction; and when the platform is unoccupied it is raised by the spring 2. This pushes rod 10 up and raises its head 11 out of engagement with arm 9 and permits it, aided by a spring 25, to follow-up the rocking movement of the switch arm 5 so that the car gate switch contactors 8, 8 remain bridged by the disk 7. At the same time the raised head 11 allows the switch arm 20, aided by a spring 26, to open the car light contactors 23 and close the series contactors 22. With all the hatchway doors closed, the car gate switch S, contactors 22, together with the hatchway door contactors 18, close a feed circuit to the hall-buttons which feed circuit may be traced as follows: by way of a wire 27 connected to the plus main, through hatchway door contactors 18 and wire 28, through car gate switch S and contactors 22 connected in series by a wire 29, wire 30, non-interference contactors 31 and by wire 32 to the hall-buttons 16, and from thereon through a controlling circuit in a well known manner depending on the hall-button which is pressed. A winding 33 of the non-interference relay 19 is included in the well known self-holding circuit 34 for the floor relays, etc., and, upon one of the car buttons 17 being pressed, will be energized to open the contacts 31 and open at that point the feed circuit for the hall-buttons to prevent interference from hall-buttons while the car is under dispatch. This relay may be provided with a dash-pot 35 to retard the return movement of the arm to close the contacts 31 and thereby give the hall passenger time to open the hatchway door before restoration of the hall-button feed circuit.

It will be pointed out here that the contactors 22 and 31 also are in series with the car gate switch in the feed circuit of the hall-buttons; hence, if desired the switch 22 need not be employed. But as the contactors 22 open-circuit the hall feed circuit the instant the platform is occupied and the non-interference relay does not do so until the car button is pressed, it is preferable to use said contactors 22 and so prevent a hall passenger from stealing the car control from the car passenger, which may be done if the latter after closing the car gate should delay in dispatching the car by the car button. The use of the non-interference relay 19 is essential regardless of whether the contactors 22 are used or not because it functions to prevent interference from hall-buttons while the car is under dispatch by said buttons with the car platform unoccupied, which function the contactors 22 will not perform because they are closed when the platform is unoccupied. On the other hand, the contactors 22 are opened the instant a passenger steps on the car platform to open at this time the common feed wire for the hall push-buttons, and when later or substantially at the time the car button is pressed the relay 19 operates to open said hall-button feed circuit at a second point. It will be noted that the contactors 22 maintain the hall-button feed circuit open so long as the platform is occupied, while on the other hand the relay 19 operates to again close its contacts after each car stop. The dash-pot 35 delays the closing of the hall-button feed circuit which gives the hall passenger time to open the hatchway door before the hall-button feed circuit is restored. Thus protection is afforded to the first person to dispatch the car by a hall-button, so that it cannot be taken from him by a second hall passenger who may be holding a button pressed at another hall landing or who may press such button a moment after the car stops and before the hall passenger opens the hatchway door. With the car unoccupied and under dispatch from a hall-button the contactors 22 do not afford such protection.

A passenger stepping on the car platform rocks the latter and its movement is transmitted to the rod 10 which rocks the switch arm 9 to open-circuit the car gate switch contactors 7 and 8, and at the same time the switch arm 20 is actuated to open-circuit the hall-button feed wire 30 at the contactors 22 and close the car light circuit at the contactors 23. Hence, in order for the car passenger to effect dispatch of the car by the car buttons 17 it is necessary to close the car gate so that with all the hatchway doors closed, and the car gate in closed position to close the car gate switch, a feed circuit for the car buttons is now completed which is the same as traced for the hall push-button circuit up to a junction 36 with the wire 29, and thence by common wire 37 to the car buttons.

The feature of this invention which relates only to the matter of closing the hall-button feed circuit to permit dispatch of the car with the car gate open and the platform unoccupied, is attained by the car gate switch. By including the contactors 22 and 31 in this same feed circuit further important advantages are attained. The relay 19 may be used without the contactors 22, to prevent interference from hall-buttons. But by adding the series contactors 22, the hall-button circuit is broken the instant the car platform is occupied. This advantage cannot be attained by the use of the non-interference relay now used in common practice, which functions substantially the same as the relay 19 but without delaying the restoration of the hall-button circuit, which is a new feature of the present invention.

Figure 2:
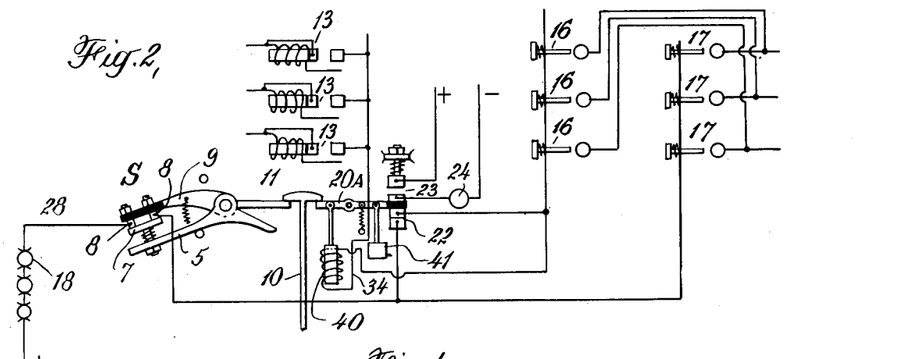
Fig. 2 is a diagram of a modified arrangement of circuits and some of their associated parts.

In Fig. 2 the switch arm 20A is provided with an operating winding 40 included in the self-holding circuit 34, and a dash-pot 41 is provided to retard the return movement of the arm to close contactors 22. The mechanical connection 10 with the movable platform is the same as in Fig. 1. By this arrangement the contactors 22 will function to afford the protection above pointed out as provided by the relay 19 and hence the latter can be dispensed with. With the car under dispatch from a hall-button, the winding 40 will be energized to open the contactors 22 and close the car light contactors 23. Hence, when the winding 40 is de-energized for stop, the movement of the switch arm 20A is retarded by the dash-pot and a spring pressed member of contactors 23 will follow up its coacting movable member for some distance so that the car light circuit is maintained after stop for a short period. In this manner the car light will be already on when the car reaches a landing and will afford safety for the passenger in stepping on the car platform. But its circuit is maintained only for a predetermined short period of time so that if the hall passenger does not enter the car the light will not continue on. Of course, when the platform is occupied, the rod 10 actuates the switch arm to close the light contactors 23, so that the light will be on so long as the platform is occupied, and at the same time, the contactors 22 are opened instantaneously as soon as the platform is occupied to open the hall-button feed circuit to prevent interference from the hall-buttons. Furthermore, because of the delayed movement of the car light controlling contactors 23, the car light will remain on for a short period of time after the last passenger steps off the car platform to provide a safe-guard for a hall passenger in waiting to use the car as the last car passenger steps off.

Figure 3:
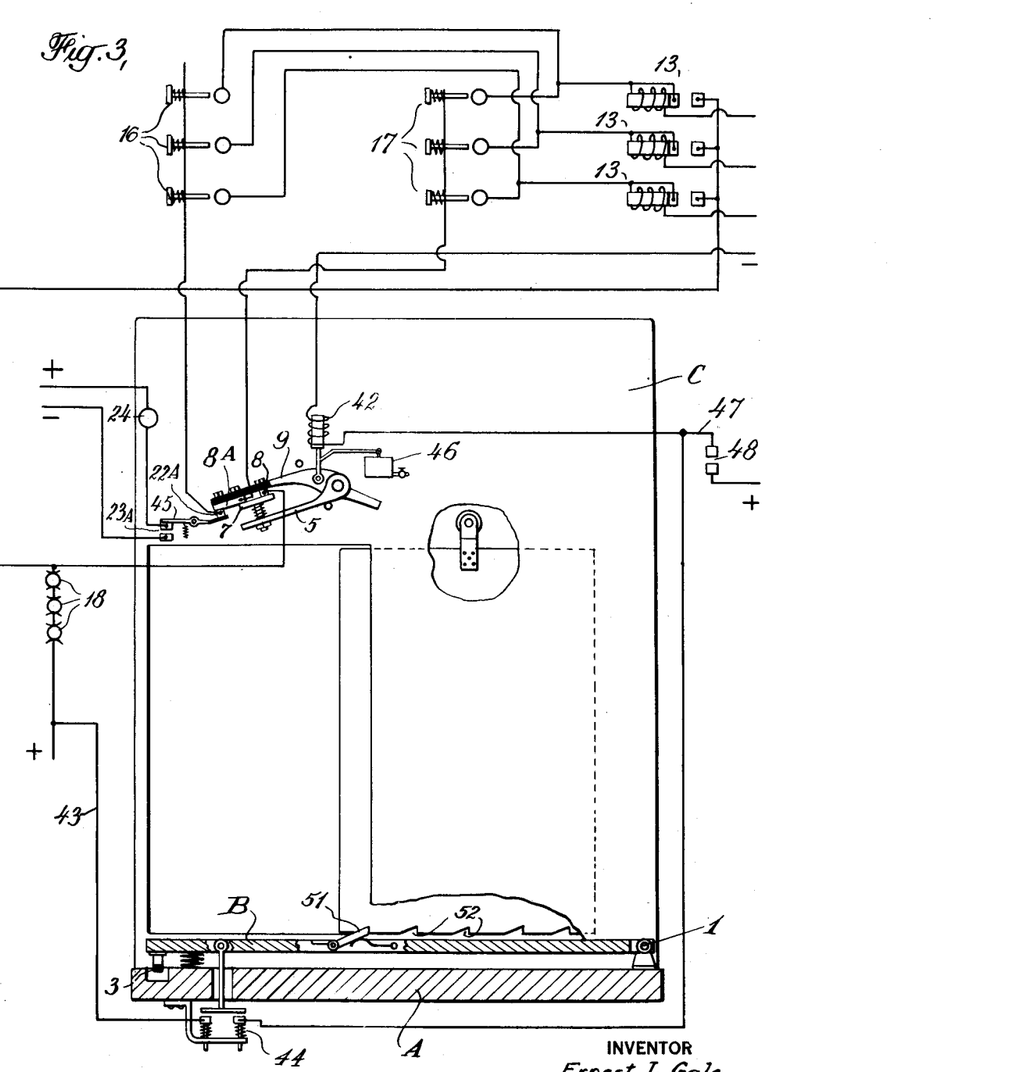
Fig. 3 shows another arrangement of instrumentalities and circuits which embody this invention; and A still further modification of some of the parts is illustrated in Fig. 4.

In the construction illustrated in Fig. 3, the car gate switch arm 9 is provided with an actuating magnet 42, whose energizing circuit 43 is closed by a platform controlled switch 44, so long as the car platform is occupied, and during this time the magnet 42 maintains the arm 9 in its uppermost position so that in effect the car gate switch is open-circuited by actuation of the arm 5 by opening the car gate when the platform is occupied. Hence, to dispatch the car by the car buttons, the car gate switch, and of course all the hatchway doors, must be in closed position.

The car gate switch in this instance is constructed with one of the contacts 8A elongated somewhat to coact with both the car gate disk contact 7 and an additional contact 22A carried by a pivoted switch arm 45 which controls contacts 23A for the circuit of the car light 24 by movement of the car gate switch arm 9. The car gate switch so constructed and provided with the operating winding 42 and a dash-pot 46 to retard the follow-up movement of the arm 9 with respect to the arm 5, has the additional function of a non-interference switch to afford the protection described in connection with the non-interference switch 19 of Fig. 1 and provides the benefits afforded also by the switch 22 of Fig. 1. For example, as soon as the car platform is occupied, the car gate switch arm 9 is raised instantaneously to open-circuit the elongated contact 8A and the contact 22A to prevent interference from the hall-buttons by opening the feed circuit thereto. In order to close the feed circuit for the car buttons, the car gate must be closed to cause the contact disk 7 to engage both contacts 8 and 8A, and with the arm 9 raised the car light circuit is closed at the contactors 23A. Hence, with all the hatchway doors closed, the car can now be dispatched by a car button.

With the platform released of its load, as by the last car passenger stepping therefrom, the platform moves to open the switch 44 to de-energize the winding 42 and with the car gate in open position the disk 7 is in open-circuited position and the arm 9 will now rock to engage both contacts 8 and 8A with the contact disk 7 and such movement of the arm 9 at the same time causes the elongated contact 8A to engage with the contact 22A and by so doing rocks the switch arm 45 to open the car light circuit at the contacts 23A. We now have the feed circuit for the hall-buttons closed by way of the hatchway door contacts, the car gate switch and the contacts 22A to permit dispatch of the car by the hall-buttons with the car gate open and the platform unoccupied. The car gate switch after functioning to permit dispatch by the hall-buttons will be open-circuited by raising the arm 9 as effected by energizing the winding 42 by way of a circuit 47 which is closed by contacts 48 when either reversing switch closes.

By this mode of operation of the car gate switch, it functions to prevent interference from hall-buttons while the car is under dispatch by a hall-button. The arm 9 now being in raised position permits the car light circuit to be closed at the contactors 23A. Thus we have the car light circuit closed during dispatch of the car by the hall-buttons and when car stop is effected by opening a reversing switch, the winding 42 is thereby de-energized to permit the switch arm 9 to rock to again close the feed circuit. However, the dash-pot 46 retards such movement of the arm 9 and delays the closing of the feed circuit to give the hall passenger time to open the hatchway door. By this delayed or retarded movement of the arm, the car light circuit is maintained after stop to afford safety for the hall passenger in stepping on the car platform. However, the period through which the light circuit is maintained after stop is relatively short, the circuit being opened by subsequent movement of the arm 9 if the hall passenger should not use the car, so that there is no wasteful consumption of current when the platform is not occupied.

In order to permit the car gate switch arm 9 to function to prevent interference and to operate with a delayed movement so as to afford the advantages pointed out for hall-button operation with the car gate open and the platform unoccupied, it becomes necessary to prevent closing of the car gate by the last passenger to leave the car. For this purpose a pawl 51 carried by the platform is provided which, by movement of the latter when unoccupied, engages a rack portion 52 on the bottom of the car gate. As soon as the car platform is occupied the pawl moves with it to an inoperative position with respect to the gate rack so that the car gate may be closed.

Figure 4:
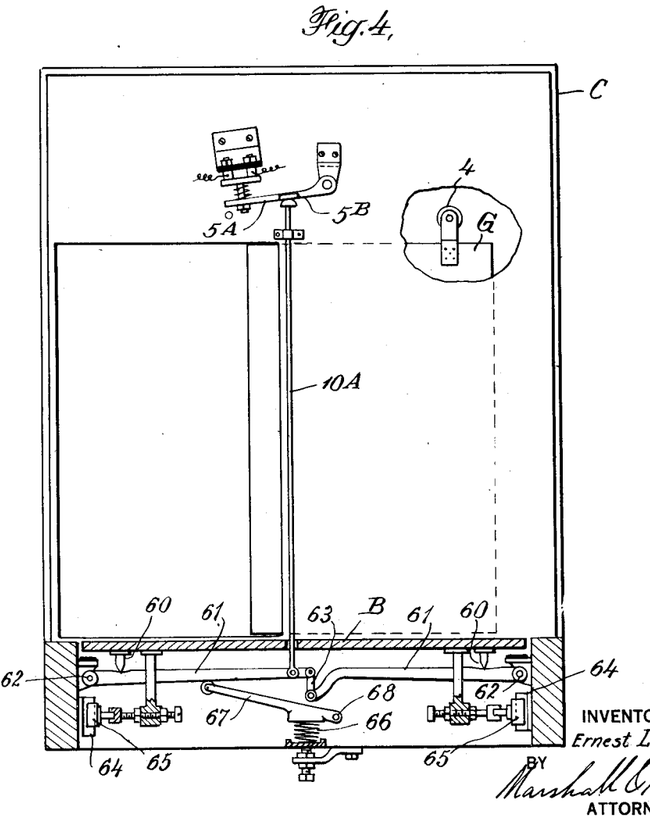

A simple car gate switch of well known type having a single movable arm 5A, is shown in Fig. 4. This is actuated in the usual way by movement of the car gate, and also as arranged in accordance with the present invention, it is controlled by the movement of the car platform. When the platform is unoccupied it rises and through a rod 10A closes the car gate switch if the car gate is open. The arm 5A is provided with an offset lip 5B, out of the path of movement of the car gate roller 4, to be engaged by the end of the rod 10A. When a passenger steps onto the platform the rod 10A is lowered out of engagement with the lip 5B to permit the car gate switch to open, thus necessitating the closure of the car gate in order to permit dispatch of the car by the car buttons.

In Fig. 4 the car platform B is mounted to maintain its horizontal position during its vertical movement. This is accomplished by supporting it as at 60, on scale beams 61 pivoted at 62 and connected by a link 63. The rod 10A is connected to one of the scale beams. 64 are guides affixed to the car frame and 65 are guide shoes adjustably connected to the platform. By this arrangement the platform is held against lateral movement so that all tendency for it to wobble is overcome without materially adding to its sensitiveness to respond to weights upon it. A spring 66 is arranged to force a lever 67, which is pivoted at 68, up against one of the scale beams to slightly overbalance the weight of the platform. A spring is preferable to a weight for this purpose, as it is not affected by the inertia or momentum of the car in starting and stopping.

This or other mechanisms for supporting the platform movably in relation to the car frame may be employed with any of the embodiments of the invention herein shown and described. Several arrangements have been illustrated to show that this invention is not limited to any specific arrangement and no limitations are intended other than those imposed by the following claims.

I claim:

1. In an electric control system for elevators, the combination with a car comprising means to act as a tell-tale for occupied and unoccupied car condition, a car gate, and a switch controlled by both said tell-tale means and the car gate.

2. In an electric control system for elevators, the combination with a car having means to act as a tell-tale for occupied and unoccupied condition thereof, a car gate, and a switch, controlled by said tell-tale movement and the car gate.

3. In an electric control system for elevators, the combination with a car comprising in its construction movable means to act as a tell-tale for occupied and unoccupied condition thereof, a car gate, and a switch actuated by both the movable means and the car gate.

4. In an electric control system for elevators, the combination with a car having a movable platform, a switch controlled by said platform, and a car gate to actuate said switch.

5. In an electric control system for elevators, the combination with a car, a switch, a car gate to open and close said switch, and means independent of said car gate to control opening and closing of said switch.

6. In an electric system of control for elevators, the combination with a car having a movable platform a car gate and a switch opened by opening said car gate and closed by said movable platform when unoccupied.

7. In an electric control system of elevators, the combination with a car comprising means to act as a tell-tale for occupied and unoccupied car condition; a switch controlled by said tell-tale means to be closed with the car unoccupied and opened with the car occupied, and a car gate operable to open and close said switch with the car occupied.

8. In an electric control system for elevators, the combination with a car comprising means to act as a tell-tale for occupied and unoccupied car condition, a car gate, a switch actuated by the car gate, and a connection between the said switch and said tell-tale means.

9. In an electric control system for elevators, the combination with a car comprising a movable platform, a car gate, a switch actuated thereby, and means whereby said switch is controlled by said movable platform.

10. In an electric control system for elevators, the combination with a car comprising means to act as a tell-tale for occupied and unoccupied car condition, a car gate, a switch actuated by said gate, and a connection between said switch and tell-tale means, said connection permitting opening and closing of said switch by the car gate when the car is occupied.

11. In an electric control system for elevators, the combination with a car comprising means to act as a tell-tale for occupied and unoccupied car condition, a car gate, and a switch comprising a pair of movable members, one controlled by said tell-tale means and the other controlled by said car gate.

12. In an electric control system for elevators, the combination with a car comprising means to act as a telltale for occupied and unoccupied car condition, a car gate, and a switch comprising a pair of independently movable members, one controlled by said telltale means to close-circuit said switch when the car is unoccupied, and the other movable by the car gate to open-circuit and close-circuit said switch when the car is occupied.

13. In an electric control system for elevators, the combination with a car having a movable car platform, a car gate, a switch comprising a pair of independently movable switch arms, a connection between one of said switch arms and the movable platform, and the other arm being controlled by the car gate.

14. In an electric control system for elevators, the combination with a car comprising means to act as a tell-tale for occupied and unoccupied car condition, a switch comprising a pair of independently movable members, means controlled by the tell-tale means to actuate one of said members, and additional means to actuate the other member.

15. A car gate switch for elevators comprising a pair of independently movable members, one member actuated by the car gate to open-circuit said switch, and the other member having a follow-up movement to close-circuit said switch.

16. A car gate switch for elevators comprising a pair of independently movable members, one member being actuated by the car gate to open-circuited position, the other member following up said movement of said first moved member to close-circuit said switch, and a dash-pot to retard the follow-up movement of the latter named member.

17. A car gate switch for elevators comprising a pair of independently movable members, one member being actuated by the car gate, and an electro-magnet to actuate the other member.

18. A car gate switch for elevators comprising a pair of independently movable members, one member actuated by the car gate, an electro-magnet to actuate the other member, and a dash-pot to retard movement of the latter member.

19. A car gate switch for elevators comprising a pair of movable members, one member actuated by the car gate, the other member having a follow-up movement to close said switch, and an electro-magnet to actuate one of said members.

20. A car gate switch for elevators comprising a pair of movable members, one member actuated by the car gate, the other member having a follow-up movement to close said switch, an electro-magnet to actuate said latter named member, and a dash-pot to retard said follow-up movement.

21. In an electric control system for elevators, the combination with a car comprising means to act as a tell-tale for occupied and unoccupied car condition, a car gate, a switch actuated by the car gate, and an electro-magnet controlled by said tell-tale means to actuate said switch.

22. In an electric control system for elevators, the combination with a car of means having movement to act as a tell-tale for occupied and unoccupied car condition, and an electro-responsive device, energized as soon as the car is occupied, by a circuit controlled by said tell-tale movement of said means.

23. In an electric control system for elevators, the combination with a car comprising means to act as a tell-tale for occupied and unoccupied car condition, a car gate, a car gate switch, an electro-magnet to actuate said gate switch and an energizing circuit for said electro-magnet, controlled by said tell-tale means, to maintain said magnet energized so long as the car is occupied, and to de-energize said magnet when the car is unoccupied.

24. In an electric control system for elevators, the combination with a car comprising means to act as a tell-tale for occupied and unoccupied car condition, a car gate switch comprising independently movable members, one actuated by the car gate, and the other having a follow-up movement to close-circuit said gate switch, an electro-magnet having a circuit controlled by said tell-tale means, to prevent said follow-up movement by said member while the car is occupied, so that said gate switch is opened and closed by opening and closing the car gate, said means de-energizing said magnet when the car is unoccupied to permit said follow-up movement of said member to close said gate switch with the car gate open.

25. In an electric control system for elevators, the combination with a car comprising means to act as a tell-tale for occupied and unoccupied car condition, a car gate switch comprising independently movable members, one actuated by the car gate, an electro-magnet having a circuit controlled by said tell-tale means, to actuate the other member to open-circuit the switch with the car gate open, and thereby necessitate actuation of the car gate actuated member by closing said gate, to close said gate switch and an additional circuit controllable only during dispatch of the car when unoccupied to be opened for each car stop to de-energize said magnet to permit its associated member by follow-up movement to close the gate switch provided the car gate is open.

26. In an electric control system for elevators, the combination with a car comprising means to act as a tell-tale for occupied and unoccupied car condition, a car gate switch comprising independently movable members, one actuated by the car gate, an electro-magnet to actuate the other member, a circuit controlled by the tell-tale means to maintain said magnet energized while the car is occupied so that said magnet maintains said other member in position so that opening the car gate opens said switch and closing the car gate closes said switch, and an additional circuit operable only by dispatch of the car when unoccupied, to be opened for each car stop to de-energize said magnet to permit its associated member by a follow-up movement to close the car gate switch.

27. In an electric control system for elevators, the combination with a car comprising means to act as a tell-tale for occupied and unoccupied car condition, a car gate switch comprising independently movable members, one actuated by the car gate, an electro-magnet controlled by said tell-tale means while the car is occupied to actuate the other of said members to a position so that the gate switch is open-circuited with the car gate open and is close-circuited by closing said gate, and means operable only by dispatch of the car when unoccupied, to de-energize said magnet for each car stop, to permit its associated member to close the car gate switch, and means controlled by said tell-tale means to hold the gate against movement to closed position when the car is unoccupied, and permitting said gate to be opened and closed without restraint while the platform is occupied.

28. In an electric system of control for elevators, the combination with a car having means to act as a tell-tale for occupied and unoccupied condition, a car gate switch, means controlled by said tell-tale movement when the car is unoccupied to close said switch, and to open said switch when said car is occupied said switch being opened and closed by opening and closing the car gate when the car is occupied, an electro-magnet to open said switch by dispatch of the car while unoccupied and being de-energized for each car stop, and a dash-pot to delay the closing of said gate switch when said magnet is de-energized.

29. In an electric control system for elevators, the combination with a car having means to act as a tell-tale for occupied and unoccupied condition, a car gate switch, means actuated by said tell-tale movement when the car is unoccupied to close said switch, an electro-magnet controlled by said tell-tale movement to open-circuit the gate switch when the car is occupied to necessitate the closing of the car gate to close said switch, means to energize said electro-magnet to open-circuit said gate switch by dispatch operation of the car when unoccupied, said means de-energizing said electro-magnet for each car stop to permit said gate switch to close, and a dash-pot to retard said closing of said switch.

30. In a push button control system for elevators comprising hall push-buttons and a feed wire common to said buttons, a car comprising means to act as a tell-tale for occupied and unoccupied car condition, a car gate switch in said feed circuit, said switch being closed by said tell-tale means when the car is unoccupied to permit dispatch of the car by said hall-buttons with the car gate in open position; and opened when the car platform is occupied so that under the latter condition said switch is opened by opening the car gate and closed by closing the car gate.

31. In a push-button control system for elevators, comprising hall push-buttons, a car comprising means to act as a tell-tale for occupied and unoccupied car condition, a feed wire common to said hall-buttons, a switch in said feed wire opened by said tell-tale means when the car is occupied, and closed when the car is unoccupied initially to close said feed wire, to permit dispatch of the car and opened to prevent interference from said hall-buttons while the car is under dispatch and controlling said switch to close when the car is stopped, and means to delay the closing of said switch and thus introduce a time period to enable the hall-passenger to occupy the car before restoration of said feed wire by said switch.

32. In a push-button control system for elevators comprising hall push-buttons, a car comprising means to act as a tell-tale for occupied and unoccupied car condition, a feed wire common to said hall-buttons, a switch in said feed wire, controlled by said tell-tale means when the car is unoccupied initially to close said feed wire to permit dispatch of the car by said hall-buttons, an electro-magnet operable by dispatch of the car by said hall-buttons, to open-circuit said switch to prevent interference from hall-buttons while the car is under dispatch thereby, said electro-magnet being de-energized when the car stops, to permit said opened switch to close, and a dash-pot to retard said closing of said switch, to delay restoration of said hall-button feed wire.

33. In a push-button control system for elevators, comprising hall push-buttons, a car comprising means to act as a tell-tale for occupied and unoccupied car condition, a feed wire common to said hall-buttons, a switch in said feed wire opened by said tell-tale means as soon as the car is occupied, to prevent interference from hall-buttons under such car condition, and closed by said tell-tale means when the car is unoccupied initially to close said feed wire circuit to permit dispatch of the car by the hall-buttons and being opened by such dispatch of the car to prevent interference from hall-buttons while the car is under dispatch thereby, and being closed when the car stops, and means to delay such closing of said switch to introduce a time period to enable the hall-passenger to occupy the car before restoration of the said hall-button feed wire.

34. In a push-button control system for elevators, comprising hall and car push-buttons and feed wires therefor in parallel, a car comprising means to act as a tell-tale for occupied and unoccupied car condition, a car gate switch actuated to closed position by said tell-tale means when the car is unoccupied, and being opened by said tell-tale means when the car is occupied, said switch being constructed and arranged so that opening thereof by said tell-tale means opens the hall-button feed wire, and closing thereof by the car gate is effected without closing said hall-button feed-circuit, so that with the car occupied and car gate closed, the hall-button feed circuit is open at the car gate switch which latter at the same time closes the car button feed circuit, said hall-button feed circuit being closed by said gate switch when the car is unoccupied and the car gate open.

35. In a push-button control system for elevators, comprising selectively operable hall and car push-buttons a wire feeding branch circuits, one circuit being common to the hall-buttons and one circuit common to the car buttons, a car gate switch operable for one position to close said wire to feed both of said branch circuits, and for another position to open and close the car button branch circuit and at the same time maintain the hall-button branch circuit open.

36. In a push-button control system for elevators, comprising hall and car push-buttons, a wire feeding branch circuits, one circuit being common to the hall-buttons, and another circuit common to the car buttons, a car gate switch, a car having means to act as a tell-tale for occupied and unoccupied car condition, said means actuating said gate switch to connect said feed wire with both of said branch circuits when the car is unoccupied, and opening said gate switch when the car is occupied, and a car gate to actuate the car gate switch to open and close said car button branch circuit while the car is occupied and under which condition said car gate switch maintains the hall-button branch circuit open.

37. In a push-button control system for elevators, comprising hall and car push-buttons, a wire feeding branch circuits, one circuit common to the hall-buttons, and another circuit common to the car buttons, a car gate switch, a car having means to act as a tell-tale for occupied and unoccupied car condition said means actuating said gate switch to connect said feed wire with both of said branch circuits when the car is unoccupied, and opening said gate switch when the car is occupied, a car gate to actuate the car gate switch to open and close said car button branch circuit while the car is occupied and means operable while the car is occupied to prevent movement of the gate switch to close said hall-button branch circuit.

38. A car gate switch for elevators operable for one position to electrically connect one wire with two wires in parallel, and for another position to open and close said connection for one of said parallel wires and at the same time maintain the connection for the other parallel wire open.

39. A car gate switch for elevators, constructed to feed branch wires fed from a single wire, so that for one position of the switch both branch wires are electrically connected with the single wire, and for another position thereof, one of the branch wires is open circuited, while at the same time the other branch wire is electrically connected to and disconnected from said single wire by closing and opening the car gate.

40. A car gate switch for elevators having hall-buttons, car-buttons and circuits therefor, said switch being constructed and arranged so that for one position thereof it closes parallel circuits, one feeding the hall-buttons and one feeding the car buttons and for another position thereof it open-circuits both of said circuits, and for which position thereof it is operable to be actuated by the car gate to open and close the car button circuit while at the same time it maintains the hall-button parallel circuit open.

41. In a push-button system of control for elevators, comprising car and hall push-button feed circuits in parallel, a car comprising means to act as a tell-tale for occupied and unoccupied car condition, a car gate switch comprising independently movable members operable for one position to close both feed circuits for the car and hall push-buttons when the car is unoccupied, and means controlled by said tell-tale means to actuate one of said members to open both of said feed circuits.

42. In a push-button system of control for elevators, comprising car and hall push-button feed circuits in parallel, a car comprising means to act as a tell-tale for occupied and unoccupied car condition, a car gate switch comprising independently movable members operable for one position to close both circuits when the car is unoccupied, and an electro-magnet controlled by said tell-tale means to actuate one of said members to open both of said parallel circuits when the car is occupied.

43. In a push-button system of control for elevators, comprising car and hall push-button circuits in parallel, a car comprising means to act as a tell-tale for occupied and unoccupied car condition, a car gate switch comprising independently movable members operable for one position to close both of said circuits when the car is unoccupied, an electro-magnet controlled by said tell-tale means to actuate one of said members to open both of said parallel circuits, and a car gate to actuate the other member to open and close the car button circuit while at the same time said electro-magnet maintains the hall-button circuit open.

44. In a push-button system of control for elevators, comprising car and hall push-button feed circuits in parallel, a car, a car gate switch comprising independently movable members operable for one position to close both of said circuits when the car is unoccupied and the car gate open, an electro-magnet to actuate one of said members to open-circuit both of said parallel circuits, an energizing circuit controlled to de-energize said electro-magnet for car stop controlled by said hall-buttons, to permit said member to close said gate switch, a dash-pot to retard said movement of said member to introduce a time period to enable the hall-passenger to occupy the car before restoration of the said parallel circuits, and a car gate to actuate the other of said members while the car is occupied, to open and close the car button circuit while at the same time said other member is maintained by said electro-magnet in actuated position to maintain the hall-push-button circuit open.

45. In a push-button system of control for elevators, comprising car and hall selectively operable push-buttons, parallel circuits, one common to said hall-buttons and one common to the car buttons, a car comprising means to act as a tell-tale for occupied and unoccupied car condition, a car gate switch comprising independently movable members operable for one position to close both of said parallel feed circuits to said buttons while the car is unoccupied and the car gate open, an electro-magnet controlled by said tell-tale means to be energized as soon as the car is occupied to actuate one of said members to open-circuit both of said parallel circuits and maintain said hall-button circuit open to prevent interference therefrom so long as the car is occupied, a car gate operable so long as the car is occupied to actuate the other member to open and close the car gate feed circuit, an additional circuit for said magnet controlled only by dispatch of the car by the hall-buttons, to de-energize the said electro-magnet for each car stop to permit the gate switch to close-circuit the hall-button feed circuit, and a dash-pot to retard said latter operation of the gate switch to introduce a time period to permit the hall-passenger to occupy the car before restoration of the hall-button circuit by said gate switch.

46. A car gate switch for elevators, comprising independently movable contact carrying members, one adapted for actuation by a car gate, and the other having actuating means to control the opening and closing of the gate switch contact mechanism independently of the car gate, said other member having a delayed movement to effect such closing of the gate switch contact mechanism.

47. A car gate switch for elevators, comprising two contactors in contact with each other, one of said contactors being in contact with a third contactor connected to a feed wire said two contactors each having a circuit branching therefrom, both branch circuits being fed from said feed wire, means to disengage one of said contactors from the other two to open-circuit the third contactor and also both branch circuits, and a car gate to actuate said third contactor to engage only one of said other contactors while at the same time the other contactor remains open-circuited.

48. A car gate switch for elevators comprising a contactor operable for one position to contact with two other contactors, means to disengage said first named contactor from said two contactors, and a car gate to engage one of said two contactors with said first named contactor when the latter is in actuated position as effected by said means.

49. A push-button system of control for elevators, comprising car and hall selectively operable push-buttons, a feed wire branching to form independent circuits in parallel for said car and hall buttons, a car gate switch comprising a contactor operable for one position to contact with two other contactors, said feed wire connecting with one of said latter contactors, the hall-button circuit branching from the other of said two contactors and the car button circuit branching from said first named contactor, means to disengage said first named contactor from said two contactors, and a car gate to engage said feed wire contactor with and disengage it from said car button circuit contactor when the latter is in actuated position as effected by said means.

50. A push-button system of control for elevators comprising car and hall selectively operable push-buttons, a feed wire branching to form circuits in parallel for said car and hall buttons, a car gate switch comprising a contactor operable for one position to contact with two other contactors, said feed wire connecting with one of said latter contactors, the hall-button circuit branching from the other of said two contactors, and the car button circuit branching from said first named contactor, an electro-magnet energized to move said first named contactor out of engagement with said other two contactors and de-energized to permit return movement of said first named contactor to its first mentioned position, a dash-pot to retard said return movement thereof, and a car gate to engage said feed wire contactor with and disengage it from said car button circuit contactor when the latter is in actuated position as effected by said electro-magnet.

51. A system of control for elevator car lights comprising a car having means to act as a tell-tale for occupied and unoccupied car condition, a car light, and a circuit therefor closed by said tell-tale means when the car is occupied, opened when the car is unoccupied and not under dispatch, and closed by dispatch of the car by hall-buttons so that the empty car will arrive lighted.

52. A car light circuit for elevator cars, means for automatically opening said circuit when the car is unoccupied and not under dispatch, and for closing said circuit when the car is unoccupied and under dispatch by the hall-buttons whereby the empty car will arrive lighted at its destination.

53. A car light circuit for elevator cars, and means for automatically opening and closing said circuit, and a retarding device for said means arranged to maintain the light circuit closed for a relatively short period of time subsequent to car stop.

54. A system for control of elevator car lights comprising a car having means to act as a tell-tale for occupied and unoccupied car condition; a car light, a circuit therefor and a switch to control said circuit, having a delayed opening, said opening of the switch being controlled by the tell-tale means when the last passenger leaves the car platform, and also when an empty car under hall-dispatch arrives at its destination.

55. A system of control for elevator car lights comprising a hall-button dispatch system, a car light and circuit therefor, and a switch to control said light circuit, controlled by dispatch of the car by said hall-buttons, to close said light circuit so that the car will arrive lighted at its destination, and open said switch when the car stops to open said light circuit, said opening of the switch being delayed.

56. A system of control for elevator car lights comprising a hall-button dispatch system, a car light and circuit therefor, a switch to control said light circuit controlled by dispatch of the car by said hall-buttons, to close said light circuit so that the car will arrive lighted at its destination, and opening said switch when the car stops to open said light circuit, said opening of the switch being delayed, a car having relatively movable parts arranged to act as a tell-tale for occupied and unoccupied car condition, said tell-tale movement closing said switch to close the car light circuit when the car is occupied, and permitting said switch to open with delayed movement as the last passenger leaves the car.

57. A system of control for elevator car lights comprising a hall push-button dispatch system, a car having a movable platform, and a car light having a circuit closed by movement of said platform when occupied, opened by said platform when unoccupied, provided the car is not under dispatch by said hall-buttons, and closed by dispatch of the car by said hall push buttons so that the empty car will arrive at its destination lighted, said circuit being opened subsequently to said arrival of the car provided the hall-passenger does not occupy the car within a predetermined period after its arrival.

58. A circuit for an elevator car light, car dispatching circuits comprising hall buttons, and means for closing said car light circuit by the actuation of said hall-buttons so that the empty car will arrive lighted at its destination and means for delaying the opening of said car light circuit when the car stops.

59. A system of control for an elevator comprising selectively operable push-buttons to control car dispatch, a car comprising means to act as a tell-tale for occupied and unoccupied car condition, a car light, and a circuit therefor controlled by said buttons and said tell-tale means.

60. A system of control for an elevator comprising hall push-buttons, a car light, a circuit therefor, means controlled by said hall-buttons to close said light circuit so that the car will arrive lighted, means for automatically opening said circuit when the car reaches its destination, and means to delay such opening of said circuit.

61. A system of control for elevator car lights comprising hall push-buttons, a car light, a circuit therefor, means controlled by said hall-buttons to close said light circuit so that the car will arrive lighted at its destination and being automatically opened with delayed movement, said opening being conditional on whether or not the hall-passenger occupies the car, so that the light circuit is opened subsequently to a short lapse of time after car stop provided the hall passenger does not occupy the car, and is maintained closed provided the hall-passenger occupies the car.

62. A system of control for elevator car lights comprising hall push-buttons, a car platform having tell-tale movement, a car light and circuit therefor, a switch in said circuit having a delayed movement to open said light circuit, and an electromagnet to actuate said switch, having an energizing circuit closed by said tell-tale platform as soon as the platform is occupied and opened by said platform when unoccupied and not under dispatch, and an additional circuit for said electro-magnet closed by dispatch of the car by said hall push-buttons and being automatically opened in the event of the car not being occupied during a relatively short period of time subsequent to car stop.

63. In combination, an elevator car having a movable platform, a car gate switch comprising independently movable members, one actuable by the car gate, and the other controlled by the movable car platform, a car light and circuit therefor, and a switch to control said car light circuit, operating in association with one of said gate switch members to be actuated by movement thereof.

64. In combination, an elevator car having a movable platform to act as a tell-tale for occupied and unoccupied car condition, a car gate switch comprising independently movable members, one actuable by the car gate, an electro-magnet having a circuit controlled by said movable platform, to actuate the other member, a car light and circuit therefor, and contactors to control said car light circuit, operatively associated with said electromagnetically operated member, to be actuated by movement thereof to control said light circuit.

65. A control mechanism for push-button elevators, comprising selectively operable hall push-buttons and a feed circuit therefor, a car having a movable platform to act as a tell-tale for occupied and unoccupied car condition, a car gate switch in said feed circuit having independently movable members, an electro-magnet controlled by said hall push-buttons to actuate one of said members, a car gate to actuate the other of said members, a circuit for said electro-magnet controlled by said movable platform, a car light, and means actuated by said electro-magnet to control the car light, and to control said gate switch, to prevent interference from hall buttons with the car under dispatch.

66. A control mechanism for push-button elevators, comprising a car having means to act as a tell-tale for occupied and unoccupied car condition, an electro-magnet having a circuit controlled by said movement and a car gate switch, non-interference contactors, and car-light control contactors all combined to form a unitary structure to be actuated by said electro-magnet.

67. A control mechanism for push-button elevators, comprising a car having a platform arranged to act as a tell-tale for occupied and unoccupied car condition, hall push-buttons selectively to dispatch the car, an electro-magnet having an energizing circuit closed by said platform so long as occupied and opened by the platform when unoccupied, an additional circuit for said electro-magnet to be closed by dispatch of the car by said hall-buttons and opened when the car stops, and a car gate switch and car light control contactors combined to form a unitary structure to be actuated by said electro-magnet.

68. In combination, an elevator platform pivoted to have rocking movement, a car gate switch, a connection between the platform and said gate switch to open the latter when the car is occupied to necessitate closing the car gate to close the gate switch, and to close said gate switch when the car platform is unoccupied, and the car gate in open position.

69. In a push-button control system for elevators, comprising selectively operable hall-buttons, a feed wire common to said buttons, a car having a movable platform, and a switch in said feed circuit controlled by said platform to be open-circuited as soon as the platform is occupied, to prevent interference from hall-buttons, and closed by the platform when unoccupied to permit car dispatch by said hall-buttons and being later open-circuited by such dispatch operation, and again closed when the car stops, such closing being delayed to permit the hall-passenger to occupy the car before such closing to restore the hall-button feed wire.

70. In a push-button control system for elevators, comprising a car and hall buttons, a car gate switch, and a non-interference circuit controlled by said switch, a car gate to actuate said switch, and means to restrain said car gate against closing, means for opening said car gate switch by dispatch of the car by the hall-buttons, means for automatically stopping the car and closing the switch and means for delaying the closure of said switch to enable the hall passenger to occupy the car before said switch closes.

71. An electric control system for elevators comprising in combination, an elevator car with tell-tale movable platform, and two switches having a common actuating means controlled by said tell-tale platform.

72. An electric control system for elevators comprising in combination, an elevator car with tell-tale movable platform, two switches, and a single actuating means common to both of said switches, controlled by said tell-tale platform.

73. An electric control system for elevators comprising in combination, an elevator car with tell-tale movable platform, three switches, and a single actuating means common to all three switches, controlled by said tell-tale platform, so that an occupied platform opens two and closes one, and an unoccupied platform closes said two and opens said one.

74. An electric control system for elevators comprising in combination, an elevator car with tell-tale movable platform, a car gate switch, non-interference contactors and car-light controlling switch all operatively associated to be actuated by a single actuating device controlled by said tell-tale means.

75. An electric control system for elevators comprising in combination, an elevator car with tell-tale movable platform, a car gate switch and car-light controlling switch operatively associated to be actuated by an electro-magnet controlled by said movable platform.

76. An electric control system for elevators comprising in combination, an elevator car with tell-tale movable platform, an electro-magnet controlled by said movable platform, and car light controlling contactors and non-interference contactors operatively associated for actuation by said electro-magnet.

77. In combination, an elevator car comprising a platform having tell-tale movement, a car gate, and means controlled by said platform to prevent closing of said gate when the car is unoccupied.

78. In combination, an elevator car comprising a platform having tell-tale movement, a car gate, and means to form an inter-lock between said platform and said gate.

79. In combination, an elevator comprising a platform having a tell-tale movement, a car gate, and means on the platform and on the said car gate to form an inter-lock therebetween.

80. In combination, an elevator car comprising a platform having tell-tale movement, a car gate, and means on the platform and on the said car gate to form an inter-lock to prevent closing movement of said gate when the platform is unoccupied.

81. In combination, an elevator car platform having tell-tale movement, multiple control switches, and a single actuating member common to all of said devices to actuate same concurrently, said actuating member being controlled by said platform.

82. In combination, an elevator car platform having rocking movement, a car gate, and a car gate switch comprising a pivoted switch arm controlled by both the platform and the car gate.

83. In a push-button system of control for elevators, the combination with the car, selectively operable hall-buttons, a feed circuit common to said buttons, a car gate, and a switch actuated by said car gate, in said feed circuit to close same with the car gate in open position thereby to permit dispatch of the car by said hall-buttons with the car gate open.

84. A push-button system of control for elevators comprising a car having means to act as a tell-tale for occupied and unoccupied car condition, and a non-interference switch controlled by said tell-tale movement, to open as soon as the car is occupied, said switch having a delayed movement to closed position so that the first hall-passenger to dispatch the car by hall-buttons can occupy the car before a second hall-passenger can dispatch the car from another landing.

85. A push-button system of control for elevators comprising a car having means to act as a tell-tale for occupied and unoccupied car condition, selectively operable car and hall push-buttons, and a single switch to control non-interference, controlled by said telltale movement to render the hall-buttons inoperable so long as the car is occupied, and controlled also by dispatch operation of the car by said hall-buttons, to open to prevent interference to car movement while under dispatch of a hall-button.

86. A push-button system of control for elevators comprising a car having means to act as a tell-tale for occupied and unoccupied car condition, selectively operable car and hall push-buttons, a single switch to control non-interference, controlled by said tell-tale movement to render the hall-buttons inoperable substantially instantaneously as soon as the car is occupied, and controlled also by dispatch operation of the car by said hall-buttons, to open to prevent interference to car movement while under dispatch by a hall-button, and closing with delayed movement when the car stops to introduce a time period to enable the hall-passenger to occupy the car before a second hall-passenger can dispatch the car from another landing.

87. In combination, an elevator car, a push-button control system comprising a non-interference switch having a delayed movement from open to closed position, and car light control contactors operatively associated with said non-interference switch whereby said delayed closing of the non-interference switch operates to delay the opening of said car light contactors.

88. In a push-button system of control for elevators, the combination with a car having a pivoted platform of semi-scale beam type having rocking movement as a tell-tale for occupied and unoccupied car condition, a car gate, selectively operable car and hall push-buttons, and means to feed said push-buttons necessitating the car gate being in closed position to permit car dispatch by said car buttons, and being controlled by rocking movement of said platform when unoccupied to feed said hall-buttons to permit dispatch of the car thereby with the car gate in open position.

89. In a push-button system of control for elevators, the combination with a car having a pivoted platform of semi-scale-beam type having rocking movement as a tell-tale for occupied and unoccupied car condition; car and hall push-buttons, a feed wire terminating in branch wires in parallel to feed said car and hall-buttons, a switch in said feed wire closed by rocking movement of said platform when unoccupied to permit dispatch of the car by said hall push-buttons, and contactors in said hall-button branch wire controlled to prevent interference while the car is under dispatch.

In witness whereof, I have hereunto set my hand this 24th day of March, 1927.

ERNEST L. GALE.